(12) United States Patent
Chang et al.

(10) Patent No.: US 9,123,950 B2
(45) Date of Patent: Sep. 1, 2015

(54) BATTERY MODULE AND BATTERY CELL

(71) Applicant: LG Chem, Ltd., Seoul (KR)

(72) Inventors: Sung Kyun Chang, Troy, MI (US); Juil Yum, Ann Arbor, MI (US); Heekook Yang, Troy, MI (US)

(73) Assignee: LG Chem, Ltd., Seoul (KR)

( * ) Notice: Subject to any disclaimer, the term of this patent is extended or adjusted under 35 U.S.C. 154(b) by 157 days.

(21) Appl. No.: 14/050,797

(22) Filed: Oct. 10, 2013

(65) Prior Publication Data

US 2015/0086845 A1 Mar. 26, 2015

Related U.S. Application Data

(60) Provisional application No. 61/882,772, filed on Sep. 26, 2013.

(51) Int. Cl.
*H01M 2/30* (2006.01)
*H01M 2/10* (2006.01)
*H01M 2/20* (2006.01)

(52) U.S. Cl.
CPC .............. *H01M 2/30* (2013.01); *H01M 2/1077* (2013.01); *H01M 2/206* (2013.01); *H01M 2220/20* (2013.01)

(58) Field of Classification Search
CPC ..... H01M 2/1077; H01M 2/206; H01M 2/30; H01M 2220/20
See application file for complete search history.

(56) References Cited

U.S. PATENT DOCUMENTS 6,905,790 B2 6/2005 Benson et al.
8,263,249 B2* 9/2012 Yoon ................................ 429/99
8,501,345 B2 8/2013 Gardner et al.
8,557,422 B2* 10/2013 Yoo et al. ...................... 429/94
9,024,572 B2* 5/2015 Nishihara et al. ............. 320/107

(Continued)

FOREIGN PATENT DOCUMENTS

JP 2006185713 7/2006
KR 20070025390 3/2007

(Continued)

OTHER PUBLICATIONS

U.S. Appl. No. 14/046,107, filed Oct. 4, 2013 entitled Battery Module and Battery Cell.

(Continued)

*Primary Examiner* — Stewart Fraser
(74) *Attorney, Agent, or Firm* — Buckert Patent & Trademark Law Firm, PC; John F. Buckert

(57) ABSTRACT

A battery module having first and second battery cells is provided. The first battery cell has a housing and first and second electrical terminals. The housing extends longitudinally along a first axis and vertically along a second axis. The housing has first, second, third and fourth ends. The first and second ends extend parallel to the first axis. The third and fourth ends extend parallel to the second axis. The first electrical terminal extends from the third end in a direction parallel to the first axis, and has first and second edges extending parallel to the first axis. The first edge is disposed closer to the first end than the second edge of the first electrical terminal. A distance from the second end of the housing to the second edge of the first electrical terminal is greater than a distance from the first end of the housing to the first edge of the first electrical terminal.

14 Claims, 7 Drawing Sheets

(56) References Cited

U.S. PATENT DOCUMENTS

| | | | |
|---|---|---|---|
| 2014/0050953 A1* | 2/2014 | Yoon et al. | 429/82 |
| 2015/0079455 A1* | 3/2015 | Chang et al. | 429/159 |

FOREIGN PATENT DOCUMENTS

| | | |
|---|---|---|
| KR | 20080011477 | 5/2008 |
| KR | 20110013269 | 2/2011 |
| KR | 20120016590 | 2/2012 |
| KR | 20090016279 | 2/2013 |
| KR | 20130062543 | 6/2013 |
| KR | 20130125341 | 11/2013 |
| KR | 20130137299 | 12/2013 |

OTHER PUBLICATIONS

U.S. Appl. No. 14/189,071, filed Feb. 25, 2014 entitled Battery Module.

* cited by examiner

BATTERY MODULE AND BATTERY CELL

CROSS-REFERENCE TO RELATED APPLICATIONS

This application claims priority to U.S. Provisional Patent Application No. 61/882,772 filed on Sep. 26, 2013, the entire contents of which are hereby incorporated by reference herein.

BACKGROUND

New materials for battery cells which may result in a high energy density and a relatively low cost have been investigated and studied for several years. However, the chemistry of the battery cell has not been changed greatly for over 20 years. Although some materials such as layer-layer Li-rich materials having $Li_2MnO_3$ structure or Si based materials may be able to increase energy density, they will be not be commercially available for several years. The inventors herein have recognized that a battery module energy density can be increased at a relatively low cost if the battery module space is decreased as described herein, in order to increase an electric vehicle range.

In particular, the inventors herein have recognized a need for a battery module and battery cell that have an improved placement of electrical terminals thereon that allows for an improved placement of electrical devices such as interconnect boards and wire harnesses thereon to maximize a battery system energy density by decreasing the unusable space of the battery system. A high energy density battery module can be obtained by utilizing the battery cell and the battery module described herein.

SUMMARY

A battery cell in accordance with an exemplary embodiment is provided. The battery cell includes a substantially rectangular-shaped housing and first and second electrical terminals. The housing extends longitudinally along a first axis and vertically along a second axis. The second axis is substantially perpendicular to the first axis. The housing has first, second, third and fourth ends. The first and second ends extend substantially parallel to the first axis. The third and fourth ends extend substantially parallel to the second axis. A combined length of the housing and the first and second electrical terminals in a direction parallel to the first axis is at least two times larger than a length of the housing in a direction parallel to the second axis. The first electrical terminal extends outwardly from the third end of the housing in a direction substantially parallel to the first axis. The first electrical terminal has first and second edges extending substantially parallel to the first axis. The first edge of the first electrical terminal is disposed closer to the first end of the housing than the second edge of the first electrical terminal. The first edge of the first electrical terminal is not collinear with the first end of the housing. A distance from the second end of the housing to the second edge of the first electrical terminal is greater than a distance from the first end of the housing to the first edge of the first electrical terminal. The second electrical terminal extends outwardly from the fourth end of the housing in a direction substantially parallel to the first axis. The second electrical terminal has first and second edges extending substantially parallel to the first axis. The second edge of the second electrical terminal is disposed closer to the second end of the housing than the first edge of the second electrical terminal. The second edge of the second electrical terminal is not collinear with the second end of the housing. A distance from the first end of the housing to the first edge of the second electrical terminal is greater than a distance from the second end of the housing to the second edge of the second electrical terminal.

A battery module in accordance with another exemplary embodiment is provided. The battery module includes a frame member having first and second sides. The battery module further includes first and second battery cells disposed on the first and second sides, respectively of the frame member. The first battery cell has a first housing and first and second electrical terminals. The first housing is substantially rectangular-shaped and extends longitudinally along a first axis and vertically along a second axis. The second axis is substantially perpendicular to the first axis. The first housing has first, second, third and fourth ends. The first and second ends of the first housing extend substantially parallel to the first axis. The third and fourth ends of the first housing extend substantially parallel to the second axis. A combined length of the first housing and the first and second electrical terminals in a direction parallel to the first axis is at least two times larger than a length of the first housing in a direction parallel to the second axis. The first electrical terminal extends outwardly from the third end of the first housing in a direction substantially parallel to the first axis. The first electrical terminal has first and second edges extending substantially parallel to the first axis. The first edge of the first electrical terminal is disposed closer to the first end of the first housing than the second edge of the first electrical terminal. The first edge of the first electrical terminal is not collinear with the first end of the first housing. A distance from the second end of the first housing to the second edge of the first electrical terminal is greater than a distance from the first end of the first housing to the first edge of the first electrical terminal. The second electrical terminal extends outwardly from the fourth end of the first housing in a direction substantially parallel to the first axis. The second electrical terminal has first and second edges extending substantially parallel to the first axis. The second edge of the second electrical terminal is disposed closer to the second end of the first housing than the first edge of the second electrical terminal. The second edge of the second electrical terminal is not collinear with the second end of the first housing. A distance from the first end of the first housing to the first edge of the second electrical terminal is greater than a distance from the second end of the first housing to the second edge of the second electrical terminal.

DETAILED DESCRIPTION

Figure 1:
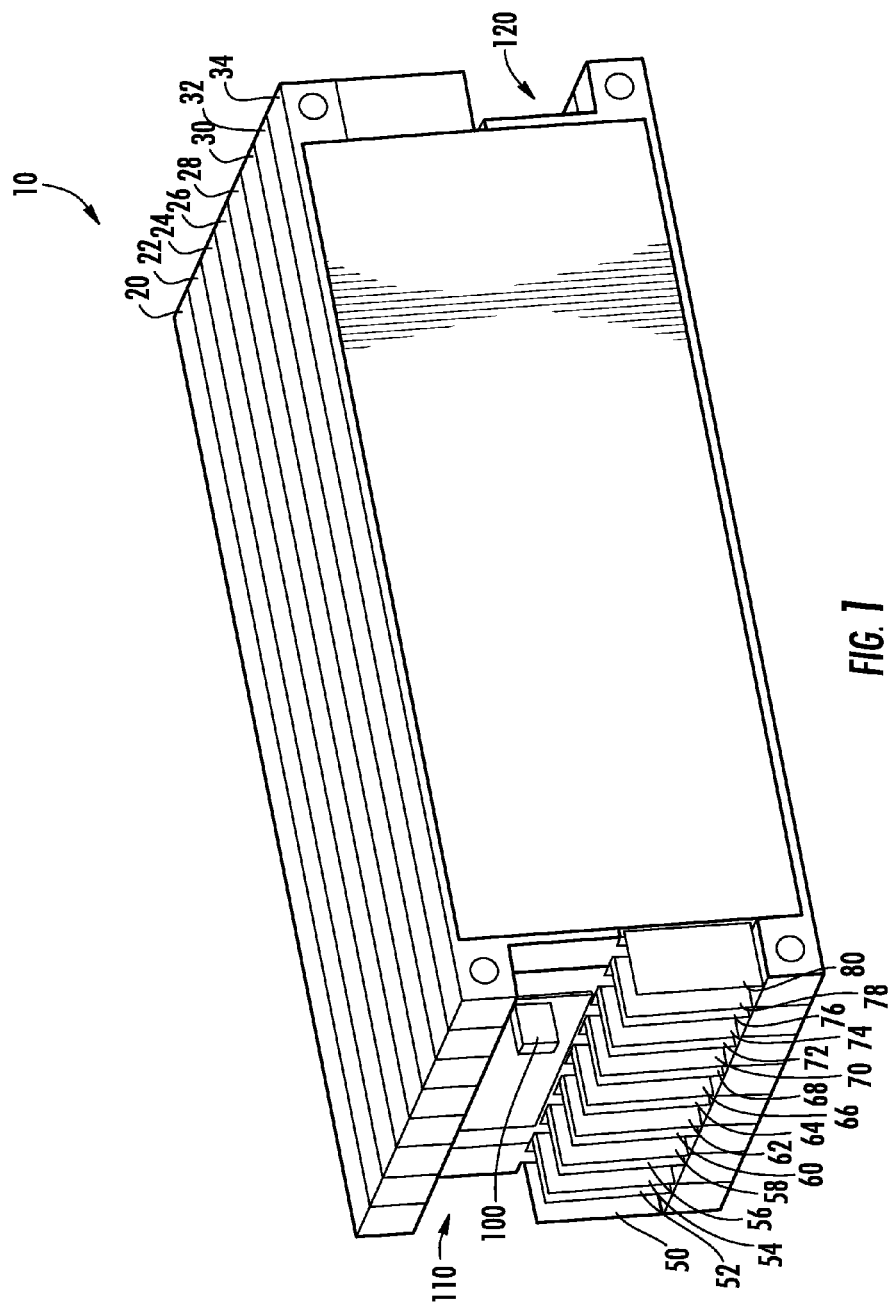
FIG. 1 is a schematic of a battery module in accordance with an exemplary embodiment.

Referring to FIGS. 1-4, a battery module 10 in accordance with an exemplary embodiment is illustrated. An advantage of the battery module 10 is that the battery module 10 has an improved placement of electrical terminals such that the battery module has open regions 110, 120 for receiving interconnect boards 100, 102 therein. Thus, the battery module 10 has an improved structural configuration that is more easily placed within an electric vehicle. The battery module 10 includes frame members 20, 22, 24, 26, 28, 30, 32, 34, battery cells 50, 52, 54, 56, 58, 60, 62, 64, 66, 68, 70, 72, 74, 76, 78, 80, and interconnect boards 100, 102.

The frame members 20-34 are configured to hold the battery cells therein. In one exemplary embodiment, the frame members 20-34 are constructed of plastic.

Figure 2:
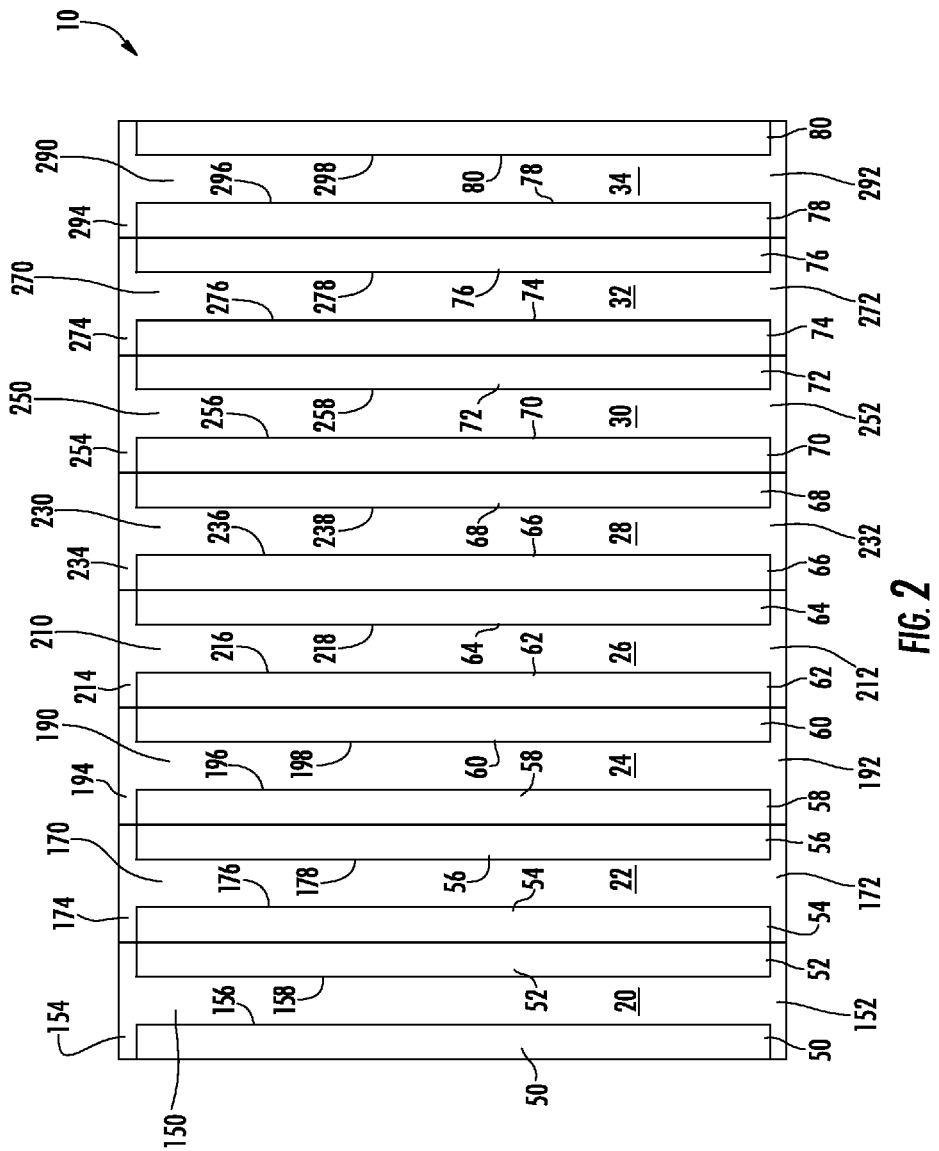
FIG. 2 is a cross-sectional schematic of the battery module of FIG. 1.
Figure 3:
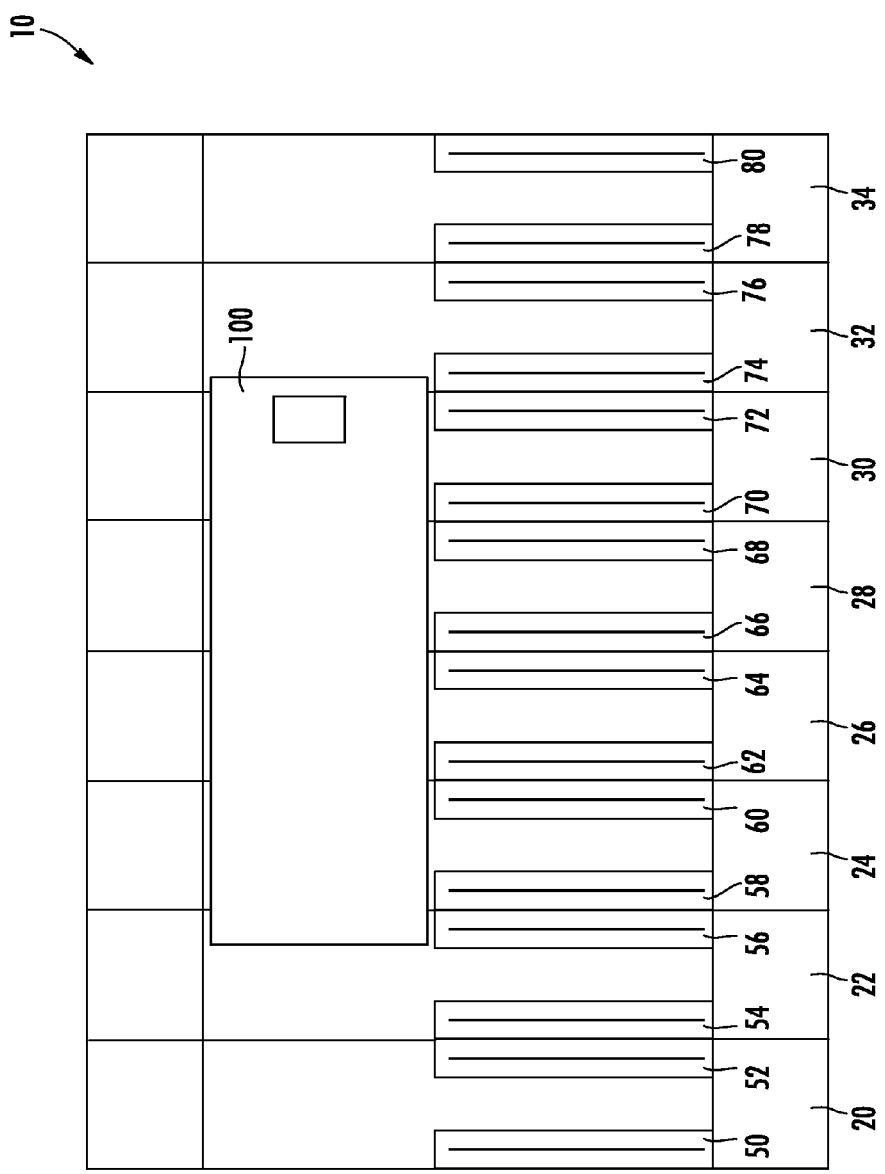
FIG. 3 is a side view of the battery module of FIG. 1.
Figure 4:
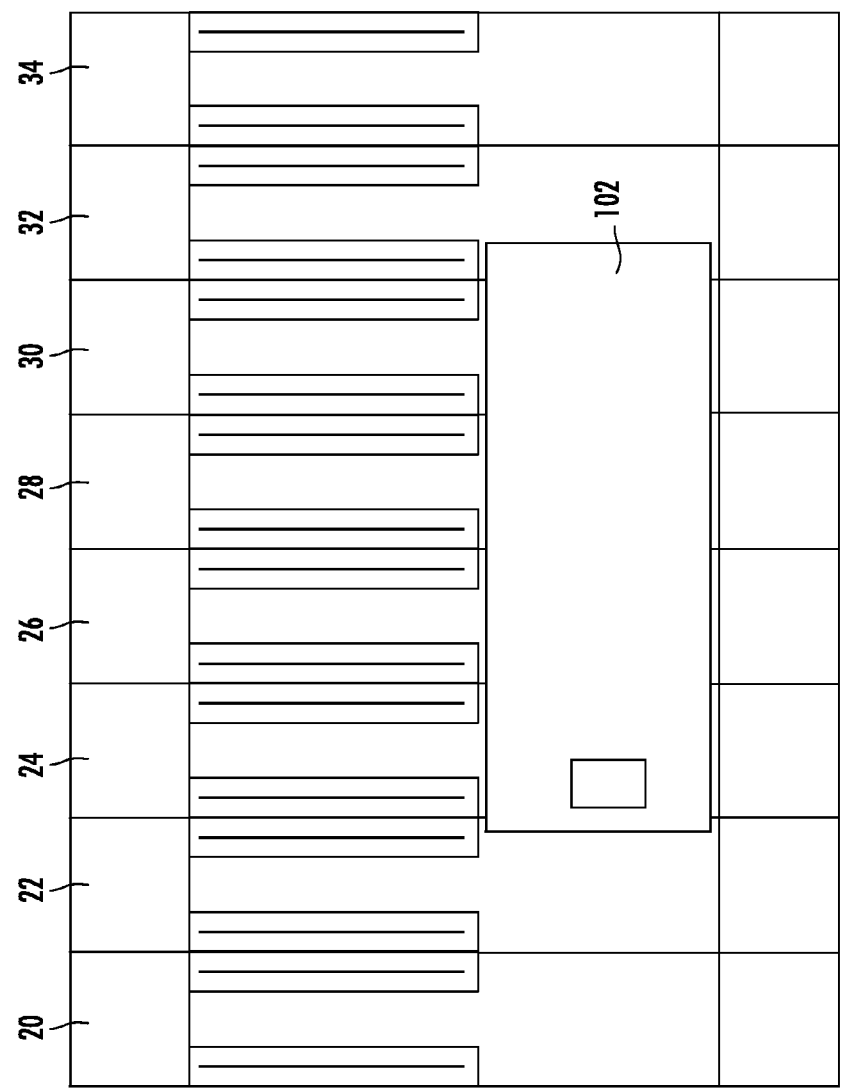
FIG. 4 is another side view of the battery module of FIG. 1.

Referring to FIG. 2, the frame member 20 includes a plate portion 150 and flange portions 152, 154. The flange portions 152, 154 are coupled to first and second ends, respectively, of the plate portion 150 and extend substantially perpendicular to the plate portion 150. The frame member 20 includes a side 156 and a side 158 that is disposed opposite to the side 156. The battery cell 50 is disposed on the side 156 of the frame member 20, and the battery cell 52 is disposed on the side 158 of the frame member 20.

The frame member 22 includes a plate portion 170 and flange portions 172, 174. The flange portions 172, 174 are coupled to first and second ends, respectively, of the plate portion 170 and extend substantially perpendicular to the plate portion 170. The frame member 22 includes a side 176 and a side 178 that is disposed opposite to the side 176. The battery cell 54 is disposed on the side 176 of the frame member 22 and adjacent to the battery cell 52, and the battery cell 56 is disposed on the side 178 of the frame member 22. The frame member 22 is coupled to both the frame member 20 and the frame member 24.

The frame member 24 includes a plate portion 190 and flange portions 192, 194. The flange portions 192, 194 are coupled to first and second ends, respectively, of the plate portion 190 and extend substantially perpendicular to the plate portion 190. The frame member 24 includes a side 196 and a side 198 that is disposed opposite to the side 196. The battery cell 58 is disposed on the side 196 of the frame member 24 and adjacent to the battery cell 56, and the battery cell 60 is disposed on the side 198 of the frame member 24. The frame member 24 is coupled to both the frame member 22 and the frame member 26.

The frame member 26 includes a plate portion 210 and flange portions 212, 214. The flange portions 212, 214 are coupled to first and second ends, respectively, of the plate portion 210 and extend substantially perpendicular to the plate portion 210. The frame member 26 includes a side 216 and a side 218 that is disposed opposite to the side 216. The battery cell 62 is disposed on the side 216 of the frame member 26 and adjacent to the battery cell 60, and the battery cell 64 is disposed on the side 218 of the frame member 26. The frame member 26 is coupled to both the frame member 24 and the frame member 28.

The frame member 28 includes a plate portion 230 and flange portions 232, 234. The flange portions 232, 234 are coupled to first and second ends, respectively, of the plate portion 230 and extend substantially perpendicular to the plate portion 230. The frame member 28 includes a side 236 and a side 238 that is disposed opposite to the side 236. The battery cell 66 is disposed on the side 236 of the frame member 28 and adjacent to the battery cell 64, and the battery cell 68 is disposed on the side 238 of the frame member 28. The frame member 28 is coupled to both the frame member 26 and the frame member 30.

The frame member 30 includes a plate portion 250 and flange portions 252, 254. The flange portions 252, 254 are coupled to first and second ends, respectively, of the plate portion 250 and extend substantially perpendicular to the plate portion 250. The frame member 30 includes a side 256 and a side 258 that is disposed opposite to the side 256. The battery cell 70 is disposed on the side 256 of the frame member 30 and adjacent to the battery cell 68, and the battery cell 72 is disposed on the side 258 of the frame member 30. The frame member 30 is coupled to both the frame member 28 and the frame member 32.

The frame member 32 includes a plate portion 270 and flange portions 272, 274. The flange portions 272, 274 are coupled to first and second ends, respectively, of the plate portion 270 and extend substantially perpendicular to the plate portion 270. The frame member 32 includes a side 276 and a side 278 that is disposed opposite to the side 276. The battery cell 74 is disposed on the side 276 of the frame member 32 and adjacent to the battery cell 72, and the battery cell 76 is disposed on the side 278 of the frame member 32. The frame member 32 is coupled to both the frame member 30 and the frame member 34.

The frame member 34 includes a plate portion 290 and flange portions 292, 294. The flange portions 292, 294 are coupled to first and second ends, respectively, of the plate portion 290 and extend substantially perpendicular to the plate portion 290. The frame member 34 includes a side 296 and a side 298 that is disposed opposite to the side 296. The battery cell 78 is disposed on the side 296 of the frame member 34 and adjacent to the battery cell 76, and the battery cell 80 is disposed on the side 298 of the frame member 34. The frame member 34 is coupled to the frame member 32.

Figure 5:
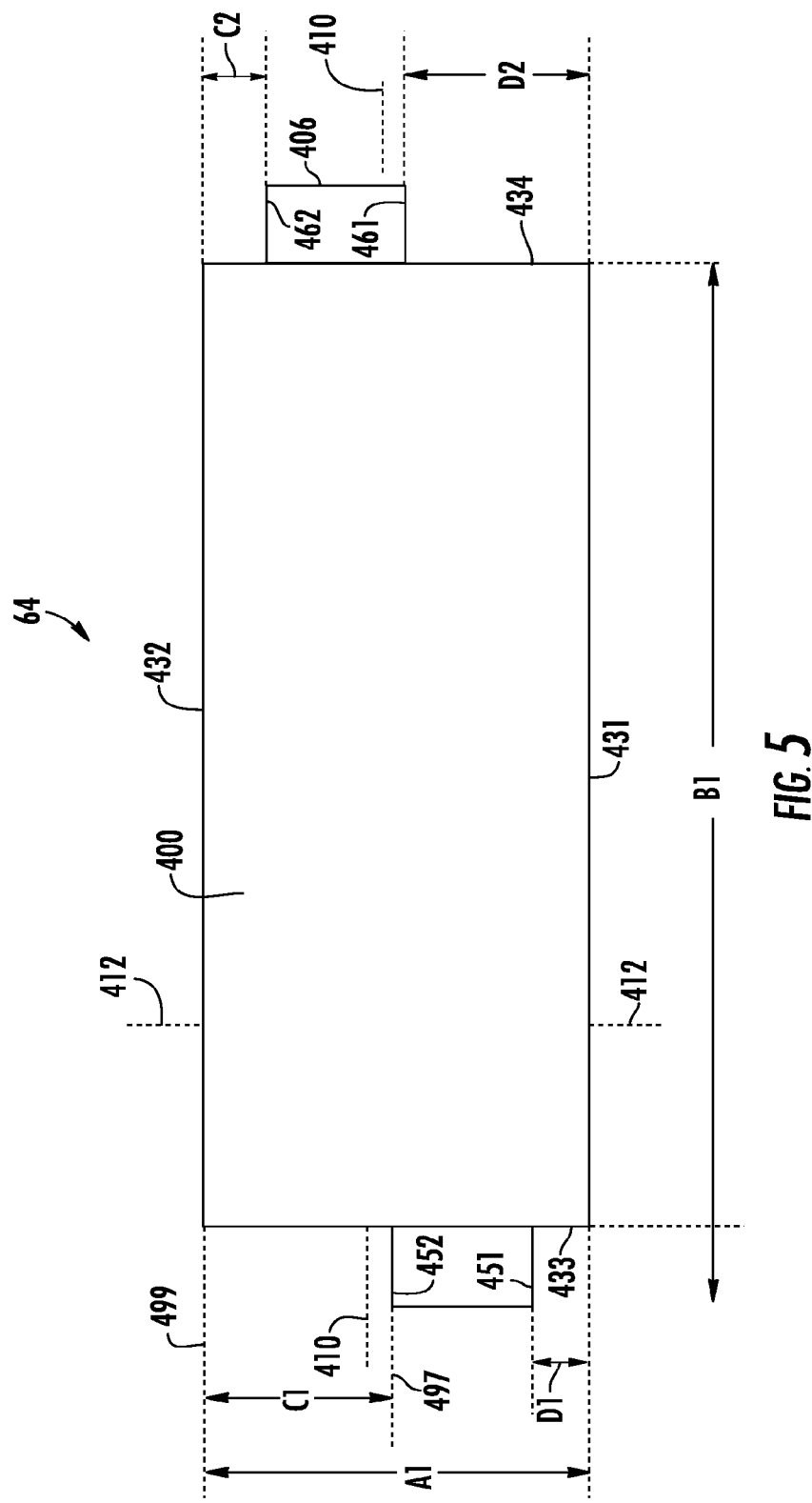
FIG. 5 is a side view of a first battery cell utilized in the battery module of FIG. 1.

Referring to FIGS. 1, 2, and 5, the battery cells 50-80 are configured to generate operational voltages. In one exemplary embodiment, the battery cells 50-80 are electrically coupled in series utilizing the interconnect boards 100, 102. Since each of the battery cells 50-80 have an identical structure, only the battery cells 62, 64 will be described in detail below.

Figure 6:
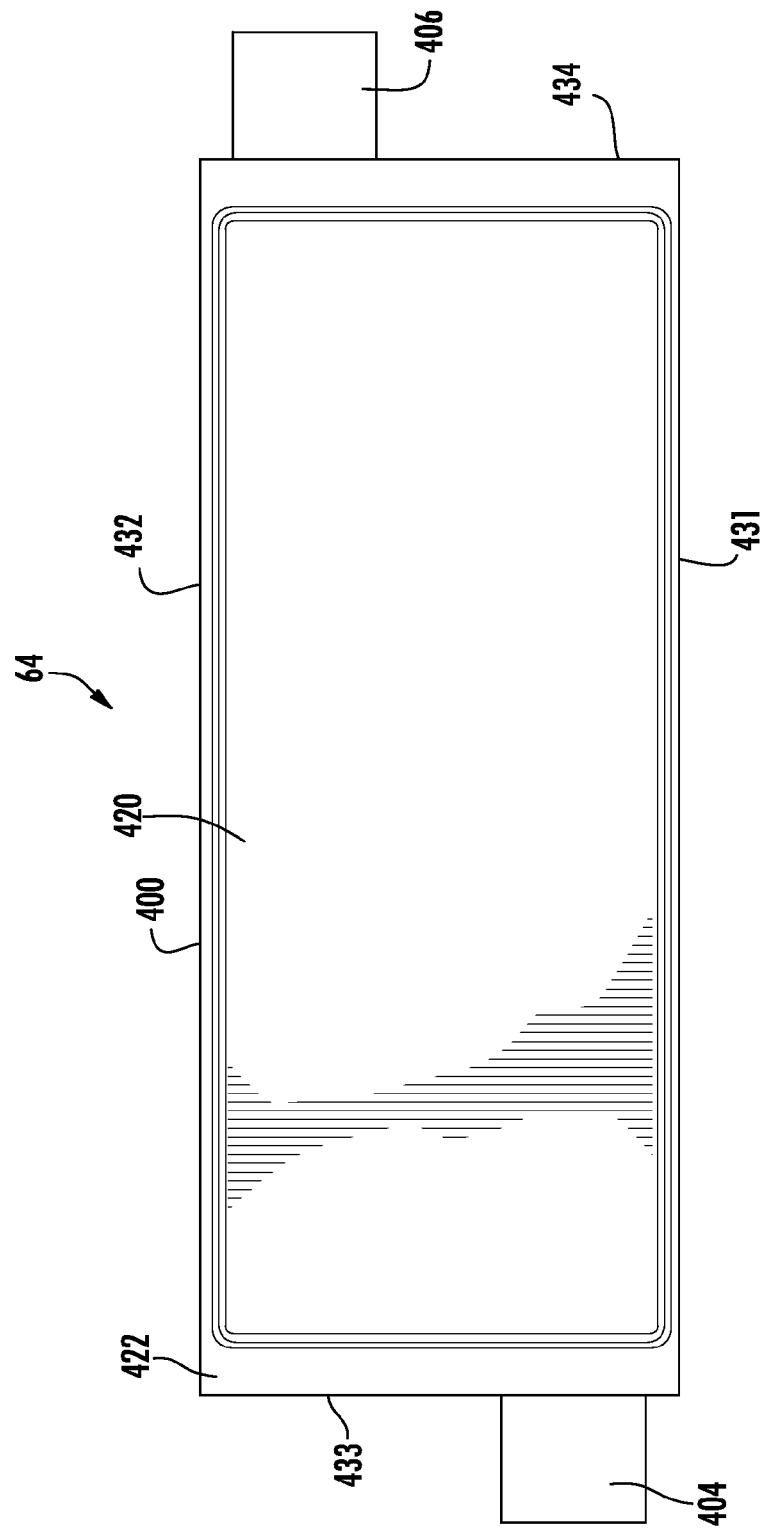
FIG. 6 is a more detailed view of the battery cell of FIG. 5.

Referring to FIGS. 5 and 6, the battery cell 64 is illustrated. The battery cell 64 includes a housing 400 and first and second electrical terminals 404, 406. The housing 400 is configured to hold an active material therein that is configured to generate an operational voltage on the first and second electrical terminals 404, 406. In one exemplary embodiment, the housing 400 is constructed of plastic and is a substantially rectangular-shaped pouch-type housing. The housing 400 extends longitudinally along a first axis 410 and vertically along a second axis 412. The second axis 412 is substantially perpendicular to the first axis 410. The housing 400 has a central body portion 420, a flange portion 422, a first end 431, a second end 432, a third end 433, and a fourth end 434. In one exemplary embodiment, the central body portion 420 holds a lithium-ion active material therein that is configured to generate a voltage between the first and second electrical terminals 404, 406. Also, the central body portion 420 is a substantially rectangular-shaped central body portion, and the flange portion 422 extends around a periphery of the substantially rectangular-shaped central body portion. The first and second ends 431, 432 extend substantially parallel to the first axis 410. The third and fourth ends 433, 434 extend substantially parallel to the second axis 412. A combined length (e.g., length B1) of the housing 400 and the electrical terminals 404, 406 in a direction parallel to the first axis 410 is at least two times larger than a length (e.g., a length A1) of the housing 400 in a direction parallel to the second axis 412.

The first electrical terminal 404 extends outwardly from the third end 433 of the housing 400 in a direction substantially parallel to the first axis 410. The first electrical terminal 404 has first and second edges 451, 452 extending substantially parallel to the first axis 410. The first edge 451 of the first electrical terminal 404 is disposed closer to the first end 431 of the housing 400 than the second edge 452 of the first electrical terminal 404. In an exemplary embodiment, the first edge 451 of the first electrical terminal 404 is not collinear with the first end 431 of the housing 400.

A distance (e.g., a distance C1) from the second end 432 of the housing 400 to the second edge 452 of the first electrical terminal 404 is greater than a distance (e.g., a distance D1) from the first end 431 of the housing 400 to the first edge 451 of the first electrical terminal 404. For example, in one exemplary embodiment, the distance from the second end 452 of the housing 400 to the second edge 452 of the first electrical terminal 404 is at least two times greater than the distance from the first end 431 of the housing 400 to the first edge 451 of the first electrical terminal 404.

The second electrical terminal 406 extends outwardly from the fourth end 434 of the housing 400 in a direction substantially parallel to the first axis 410. The second electrical terminal 406 has first and second edges 461, 462 extending substantially parallel to the first axis 410. The second edge 462 of the second electrical terminal 406 is disposed closer to the second end 432 of the housing 400 than the first edge 461 of the second electrical terminal 406. In an exemplary embodiment, the second edge 462 of the second electrical terminal 406 is not collinear with the second end 432 of the housing 400.

A distance (e.g., a distance D2) from the first end 431 of the housing 400 to the first edge 461 of the second electrical terminal 406 is greater than a distance (e.g., a distance C2) from the second end 432 of the housing 400 to the second edge 462 of the second electrical terminal 406. For example, in one exemplary embodiment, the distance from the first end 431 of the housing 400 to the first edge 461 of the second electrical terminal 406 is at least two times greater than the distance from the second end 432 of the housing 400 to the second edge 462 of the second electrical terminal 406.

Figure 7:
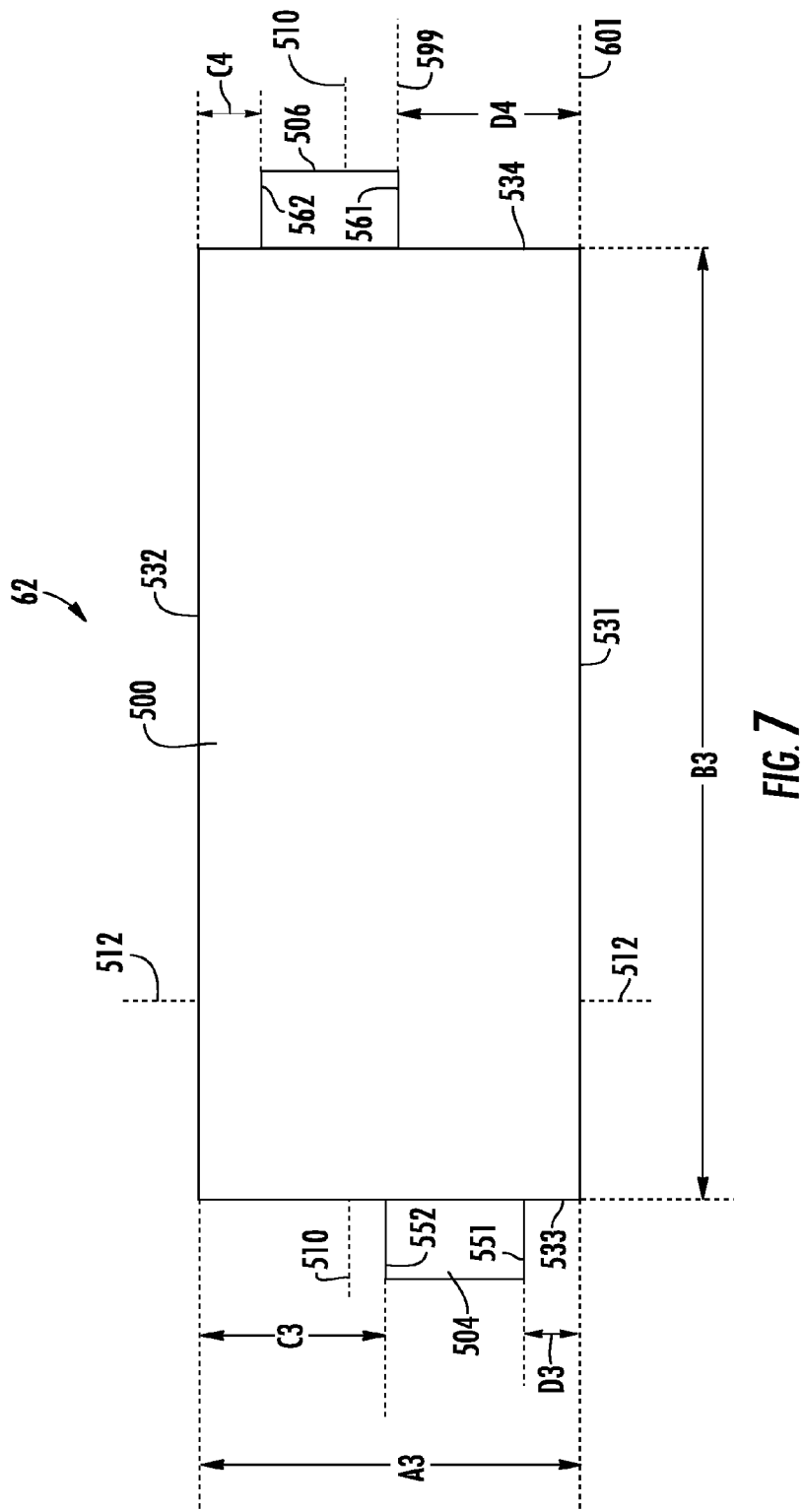
FIG. 7 is a side view of a second battery cell utilized in the battery module of FIG. 1.

Referring to FIG. 7, the battery cell 62 is illustrated. The battery cell 62 includes a housing 500 and first and second electrical terminals 504, 506. The housing 500 is configured to hold an active material therein that is configured to generate an operational voltage on the first and second electrical terminals 504, 506. In one exemplary embodiment, the housing 500 is constructed of plastic and is a substantially rectangular-shaped pouch-type housing. The housing 500 extends longitudinally along a first axis 510 and vertically along a second axis 512. The second axis 512 is substantially perpendicular to the first axis 510. The housing 500 has a first end 531, a second end 532, a third end 533, and a fourth end 534. The first and second ends 531, 532 extend substantially parallel to the first axis 510. The third and fourth ends 533, 534 extend substantially parallel to the second axis 512. A combined length (e.g., length B3) of the housing 500 and the electrical terminals 504, 506 in a direction parallel to the first axis 510 is at least two times larger than a length (e.g., a length A3) of the housing 500 in a direction parallel to the second axis 512.

The first electrical terminal 504 extends outwardly from the third end 533 of the housing 500 in a direction substantially parallel to the first axis 510. The first electrical terminal 504 has first and second edges 551, 552 extending substantially parallel to the first axis 510. The first edge 551 of the first electrical terminal 504 is disposed closer to the first end 531 of the housing 500 than the second edge 552 of the first electrical terminal 504. In an exemplary embodiment, the first edge 551 of the first electrical terminal 504 is not collinear with the first end 531 of the housing 500.

A distance (e.g., a distance C3) from the second end 532 of the housing 500 to the second edge 552 of the first electrical terminal 504 is greater than a distance (e.g., a distance D3) from the first end 531 of the housing 500 to the first edge 551 of the first electrical terminal 504. For example, in one exemplary embodiment, the distance from the second end 532 of the housing 500 to the second edge 552 of the first electrical terminal 504 is at least two times greater than the distance from the first end 531 of the housing 500 to the first edge 551 of the first electrical terminal 504.

The second electrical terminal 506 extends outwardly from the fourth end 534 of the housing 500 in a direction substantially parallel to the first axis 510. The second electrical terminal 506 has first and second edges 561, 562 extending substantially parallel to the first axis 510. The second edge 562 of the second electrical terminal 506 is disposed closer to the second end 532 of the housing 500 than the first edge 561 of the second electrical terminal 506. In an exemplary embodiment, the second edge 562 of the second electrical terminal 506 is not collinear with the second end 532 of the housing 500.

A distance (e.g., a distance D4) from the first end 531 of the housing 500 to the first edge 561 of the second electrical terminal 506 is greater than a distance (e.g., a distance C4) from the second end 532 of the housing 500 to the second edge 562 of the second electrical terminal 506. For example, in one exemplary embodiment, the distance from the first end 531 of the housing 500 to the first edge 561 of the second electrical terminal 506 is at least two times greater than the distance from the second end 532 of the housing 500 to the second edge 562 of the second electrical terminal 406.

Referring to FIGS. 1 and 5-7, the second edges (e.g., top edges) of the first electrical terminals of the battery cells 50-80 are disposed co-planar with one another such that the first open region 110 is formed between a plane 497 (shown in FIG. 5) extending through the second edges of the first electrical terminals and a plane 499 (shown in FIG. 5) extending through the second ends (e.g., top ends) of the battery cells 50-80. For example, the second edge 452 of the first electrical terminal 404 of the battery cell 64 is disposed co-planar with the second edge 552 of the first electrical terminal 504 of the battery cell 62, such that the first open region 110 is formed between the plane 497 (shown in FIG. 5) extending through the second edges of the electrical terminals 404, 504 and the plane 499 (shown in FIG. 5) extending through the second ends of the battery cells 64, 62.

Further, the first edges (e.g., bottom edges) of the second electrical terminals of the battery cells 50-80 are disposed co-planar with one another such that the second open region 120 is formed between a plane 599 (shown in FIG. 7) extending through the first edges of the second electrical terminals and a plane 601 (shown in FIG. 7) extending through the first ends (e.g., bottom ends) of the battery cells 50-80. For example, the first edge 461 of the second electrical terminal 406 of the battery cell 64 is disposed co-planar with the first edge 561 of the second electrical terminal 506 of the battery cell 62, such that the second open region 120 is formed between the plane 599 (shown in FIG. 7) extending through the first edges of the electrical terminals 406, 506 and the plane 601 (shown in FIG. 7) extending through the first ends of the battery cells 50-80.

The interconnect board 100 is coupled to the frame members in the first open region 110 and electrically couple the battery cells 50-80 to one another. In one exemplary embodiment, the interconnect board 100 electrically couples the battery cells 50-80 in series with one another. In another exemplary embodiment, the interconnect board 100 electrically couples the battery cells 50-80 in parallel with one another. Further, the interconnect board 100 may include a microprocessor which monitors operational parameters of the battery cells 50-80.

The interconnect board 102 is coupled to the frame members in the second open region 120 and electrically couple the battery cells 50-80 to one another. In one exemplary embodiment, the interconnect board 102 electrically couples the battery cells 50-80 in series with one another. In another exemplary embodiment, the interconnect board 102 electrically couples the battery cells 50-80 in parallel with one another. Further, the interconnect board 102 may include a microprocessor which monitors operational parameters of the battery cells 50-80.

The battery module and battery cell described herein provide a substantial advantage over other battery modules and battery cells. In particular, the battery module provides a technical effect of utilizing first and second electrical terminals disposed both proximate to first and second edges, respectively, of the battery cell and on opposite ends of the battery cell such that electrical components can be readily placed on the battery module, such that the battery module can be more easily placed within an electric vehicle.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery cell, comprising:
   a substantially rectangular-shaped housing and first and second electrical terminals, the housing extending longitudinally along a first axis and vertically along a second axis; the second axis being substantially perpendicular to the first axis, the housing having first, second, third and fourth ends, the first and second ends extending substantially parallel to the first axis, the third and fourth ends extending substantially parallel to the second axis; a combined length of the housing and the first and second electrical terminals in a direction parallel to the first axis being at least two times larger than a length of the housing in a direction parallel to the second axis;
   the first electrical terminal extending outwardly from the third end of the housing in a direction substantially parallel to the first axis, the first electrical terminal having first and second edges extending substantially parallel to the first axis, the first edge of the first electrical terminal being disposed closer to the first end of the housing than the second edge of the first electrical terminal, the first edge of the first electrical terminal not being collinear with the first end of the housing;
   a distance from the second end of the housing to the second edge of the first electrical terminal is greater than a distance from the first end of the housing to the first edge of the first electrical terminal;
   the second electrical terminal extending outwardly from the fourth end of the housing in a direction substantially parallel to the first axis, the second electrical terminal having first and second edges extending substantially parallel to the first axis, the second edge of the second electrical terminal being disposed closer to the second end of the housing than the first edge of the second electrical terminal, the second edge of the second electrical terminal not being collinear with the second end of the housing; and
   a distance from the first end of the housing to the first edge of the second electrical terminal is greater than a distance from the second end of the housing to the second edge of the second electrical terminal.

2. The battery cell of claim 1, wherein the substantially rectangular-shaped housing comprises a substantially rectangular-shaped pouch-type housing.

3. The battery cell of claim 1, wherein the substantially rectangular-shaped housing comprises a substantially rectangular-shaped central body portion, and a flange portion that extends around a periphery of the substantially rectangular-shaped central body portion.

4. The battery cell of claim 1, wherein the distance from the second end of the housing to the second edge of the first electrical terminal is at least two times greater than the distance from the first end of the housing to the first edge of the first electrical terminal.

5. The battery cell of claim 1, wherein the distance from the first end of the housing to the first edge of the second electrical terminal is at least two times greater than the distance from the second end of the housing to the second edge of the second electrical terminal.

6. A battery module, comprising:
   a frame member having first and second sides;
   first and second battery cells disposed on the first and second sides, respectively of the frame member;
   the first battery cell having a first housing and first and second electrical terminals, the first housing being substantially rectangular-shaped and extending longitudinally along a first axis and vertically along a second axis; the second axis being substantially perpendicular to the first axis, the first housing having first, second, third and fourth ends, the first and second ends of the first housing extending substantially parallel to the first axis, the third and fourth ends of the first housing extending substantially parallel to the second axis; a combined length of the first housing and the first and second electrical terminals in a direction parallel to the first axis being at least two times larger than a length of the first housing in a direction parallel to the second axis;
   the first electrical terminal extending outwardly from the third end of the first housing in a direction substantially parallel to the first axis, the first electrical terminal having first and second edges extending substantially parallel to the first axis, the first edge of the first electrical terminal being disposed closer to the first end of the first housing than the second edge of the first electrical terminal, the first edge of the first electrical terminal not being collinear with the first end of the first housing;
   a distance from the second end of the first housing to the second edge of the first electrical terminal is greater than a distance from the first end of the first housing to the first edge of the first electrical terminal;
   the second electrical terminal extending outwardly from the fourth end of the first housing in a direction substantially parallel to the first axis, the second electrical terminal having first and second edges extending substantially parallel to the first axis, the second edge of the second electrical terminal being disposed closer to the second end of the first housing than the first edge of the second electrical terminal, the second edge of the second electrical terminal not being collinear with the second end of the first housing; and a distance from the first end of the first housing to the first edge of the second electrical terminal is greater than a distance from the second end of the first housing to the second edge of the second electrical terminal.

7. The battery cell of claim 6, wherein the first housing comprises a substantially rectangular-shaped pouch-type housing.

8. The battery cell of claim 6, wherein the first housing comprises a substantially rectangular-shaped central body portion, and a flange portion that extends around a periphery of the substantially rectangular-shaped central body portion.

9. The battery module of claim 6, wherein:

the second battery cell having a second housing and third and fourth electrical terminals, the second housing being substantially rectangular-shaped and extending longitudinally along a third axis and vertically along a fourth axis; the fourth axis being substantially perpendicular to the third axis, the second housing having first, second, third and fourth ends, the first and second ends of the second housing extending substantially parallel to the third axis, the third and fourth ends extending substantially parallel to the fourth axis; a combined length of the second housing and the third and fourth electrical terminals in a direction parallel to the third axis being at least two times larger than a length of the second housing in a direction parallel to the fourth axis;

the third electrical terminal extending outwardly from the third end of the second housing in a direction substantially parallel to the third axis, the third electrical terminal having first and second edges extending substantially parallel to the third axis, the first edge of the third electrical terminal being disposed closer to the first end of the second housing than the second edge of the third electrical terminal, the first edge of the third electrical terminal not being collinear with the first end of the second housing;

a distance from the second end of the second housing to the second edge of the third electrical terminal is greater than a distance from the first end of the second housing to the first edge of the third electrical terminal;

the fourth electrical terminal extending outwardly from the fourth end of the second housing in a direction substantially parallel to the third axis, the fourth electrical terminal having first and second edges extending substantially parallel to the third axis, the second edge of the fourth electrical terminal being disposed closer to the second end of the second housing than the first edge of the fourth electrical terminal, the second edge of the fourth electrical terminal not being collinear with the second end of the second housing; and a distance from the first end of the second housing to the first edge of the fourth electrical terminal is greater than a distance from the second end of the second housing to the second edge of the fourth electrical terminal.

10. The battery module of claim 9, wherein the second edge of the first electrical terminal of the first battery cell is disposed co-planar with the second edge of the third electrical terminal of the second battery cell, such that a first open region is formed between a plane extending through the respective second edges of the first and third electrical terminals and another plane extending through the respective second ends of the first and second battery cells.

11. The battery module of claim 10, wherein a portion of an interconnect board is disposed in the first open region.

12. The battery module of claim 10, wherein the first edge of the second electrical terminal of the first battery cell is disposed co-planar with the first edge of the fourth electrical terminal of the second battery cell, such that a second open region is formed between a plane extending through the respective first edges of the second and fourth electrical terminals and another plane extending through the respective first ends of the first and second battery cells.

13. The battery cell of claim 6, wherein the distance from the second end of the first housing to the second edge of the first electrical terminal is at least two times greater than the distance from the first end of the first housing to the first edge of the first electrical terminal.

14. The battery cell of claim 13, wherein the distance from the first end of the first housing to the first edge of the second electrical terminal is at least two times greater than the distance from the second end of the first housing to the second edge of the second electrical terminal.

\* \* \* \* \*